United States Patent [19]

Yokoyama et al.

[11] Patent Number: 5,161,040

[45] Date of Patent: Nov. 3, 1992

[54] OPTICAL SYSTEM WITH ABERRATION SUPPRESSION AND OPTICAL HEAD UTILIZING THE SAME

[75] Inventors: Osamu Yokoyama; Shoichi Uchiyama, both of Suwa, Japan

[73] Assignee: Seiko Epson Corporation, Japan

[21] Appl. No.: 471,955

[22] Filed: Jan. 29, 1990

[30] Foreign Application Priority Data

Jan. 30, 1989 [JP] Japan ................................ 1-20135
Aug. 28, 1989 [JP] Japan ................................ 1-221227
Sep. 18, 1989 [JP] Japan ................................ 1-241165
Sep. 18, 1989 [JP] Japan ................................ 1-241170
Dec. 1, 1989 [JP] Japan ................................ 1-313190

[51] Int. Cl.⁵ .......................... G02B 5/32; G02B 5/18; G11B 7/12
[52] U.S. Cl. ....................... 359/19; 359/565; 359/566; 359/742; 369/44.12; 369/44.14
[58] Field of Search ............. 350/162.11, 162.16, 350/162.17, 3.7, 3.72, 256, 452; 369/44.32, 44.17, 44.19, 44.12, 44.14; 359/1, 19, 15–17, 27, 558, 566, 569, 565, 742

[56] References Cited

U.S. PATENT DOCUMENTS

| | | | |
|---|---|---|---|
| 4,253,723 | 3/1981 | Kojima et al. | 350/3.72 |
| 4,322,838 | 3/1982 | Neumann | 350/255 X |
| 4,497,534 | 2/1985 | Sincerbox | 350/3.72 |
| 4,654,839 | 3/1987 | Endo | 369/46 |
| 4,656,641 | 4/1987 | Scifres et al. | 372/103 |
| 4,725,721 | 2/1988 | Nakamura et al. | 250/201 |
| 4,734,905 | 3/1988 | Kuwayama et al. | 369/111 |
| 4,776,652 | 10/1988 | Ih | 350/3.72 |
| 4,779,943 | 10/1988 | Tatsuno et al. | 350/3.7 |
| 4,794,585 | 12/1988 | Lee | 369/112 |
| 4,832,464 | 5/1989 | Kato et al. | 350/3.72 |
| 4,885,753 | 12/1989 | Okai et al. | 372/45 |

OTHER PUBLICATIONS

K. Yasukawa et al., "A New Flying Optical Head", *International Symposium on Optical Memory 1989* (ISOM '89), Technical Digest, 27D-19, pp. 103–104, Sep. 26–28, 1989, Kobe, Japan.

M. Moriya et al., "CMF Actuator and High Speed Access System", National Technical Report, vol. 35(2), pp. 67–73, Apr. 1989.

*Primary Examiner*—Bruce Y. Arnold
*Assistant Examiner*—David R. Parsons
*Attorney, Agent, or Firm*—W. Douglas Carothers, Jr.

[57] ABSTRACT

An optical system, that includes a light source having sufficient coherency to provide a predominate operating wavelength and a diffraction grating lens system to focus the light from the light source to an image point on the optical axis of the optical system, provides for change of position of the image point along the optical axis over a wide focusing range with suppression of generated aberration. In particular, the optical system comprises a light source both movable in the direction of the optical axis and capable of variation in wavelength and a diffraction grating lens system that condenses the beam from the light source onto an image point on and along the optical axis, which system is effective in cancelling out aberration generated due to movement of the light source. The spherical aberration associated with the movement of the image spot brought about by the movement of the light source or its equivalent in the optical system is cancelled out by the chromatic aberration generated by the diffraction grating created by adjustment the light source wavelength.

38 Claims, 6 Drawing Sheets

OPTICAL SYSTEM WITH ABERRATION SUPPRESSION AND OPTICAL HEAD UTILIZING THE SAME

BACKGROUND OF THE INVENTION

This invention relates generally to an optical system with means for aberration suppression and more particularly to an aberration error correction optical system for use in connection with optical information processing apparatus, such as, optical disk recorders and players, optical digital recording apparatus, laser printers, magnetooptic recording and reproducing systems, optical storage information systems and the like.

In one type of conventional autofocusing/autotracking optical systems for use in connection with an optical head in optical information processing apparatus, detection of displacement of the focused light spot relative to the surface of an optical recording medium is accomplished by mechanically moving the objective lens in the system via a focusing lens drive means such as an actuator, e.g., an electromagnetic coil or the like, in accordance with the amount of detected displacement. An example of such a conventional system is disclosed in FIG. 1 relative to optical head 10. Head 10 comprises a stationary section 12 and a movable section 14 with stationary section 12 fixed to the chassis of an optical information processing apparatus. Stationary section 12 contains semiconductor laser 16, objective lens 18 and beam splitter 20. The divergent output beam from laser 16 is collimated by objective lens 18 onto beam splitter 20 and thereafter the beam is directed to movable section 14.

The movable section 14 contains a mirror 26, objective lens 28 and means 31 to move lens 28 in focusing and transverse track directions, F and T, so that image spot 30 is maintained focused on the surface of recording medium 32. Thus, the beam output of beam splitter 20 is directed onto mirror 26 which folds the beam through objective lens 28 focusing the beam to an image spot 30 on the surface of recording medium 32. Means 31 may be, for example, an actuator that moves lens 28 in the focusing direction, F, along the optical axis or path of head 10. Actuator 31 also moves lens 28 in the transverse track direction, T, to recenter the beam on a designated track on recording medium 32. Such tracking may also be accomplished by a galvano-mirror as is known in the art.

During the random accessing of data on recording medium 32, movable section 14 may be translated by means, such as voice coil motor (VCM) or the like (not shown), which translation is indicated by arrow 34 in FIG. 1.

Light reflected from recording medium 32 at image spot 30 is returned to beam splitter 20 via mirror 26 and is directed onto photodetector 24, e.g., a photodiode, via objective lens 22. Lens 22 produces a pattern on photodetector 24 which varies according to focus and tracking of image spot 30. The signal developed at photodetector 24 is employed in a focal displacement detection circuit (not shown) to produce focusing error and tracking error signals corresponding to the direction and amount of displacement and deviation of the image spot respectively in the focusing direction, F, and the transverse track direction, T. A focusing error signal contains information about the magnitude and direction of a displacement between the focal plane of lens 28 and the surface of recording medium 32 in the direction of the optical axis of system 10. A tracking error signal contains information about the magnitude and direction of a lateral deviation between a focused spot 30 and a designated track of recording medium 32. Thus, objective lens 28 may be moved in focusing direction, F, and in the transverse track direction, T, via actuator 31 based upon information received at photodetector 24, so that the position of image spot 30 will be monitored and maintained on track and in focus relative to recording medium 32. Examples of such types of focusing systems are found in U.S. Pat. Nos. 4,654,839 and 4,725,721.

An important factor in designing an autofocusing-/autotracking system is the consideration of optimization of the optical head access time in performing read/write functions relative to an optical information processing apparatus, such as an optical disk memory. Thus, the miniaturization of the optical head approach has been proposed as a way to reduce the weight and mass of head movable section 14 and, therefore, reducing inertia forces, in order to attain higher head random access speeds. See, as an example, U.S. Pat. No. 4,734,905.

However, with such an optical head, there remains the problem of correction for focusing error caused by changes in the height between the optical head focal plane and the surface of the recording medium 32 as well as variations in recording medium thickness. Further, there are limits to the improvement of access time cannot be improved due to the weight of the optical head movable section 14, in particular, the weight and mass of actuator 31 which generally weighs between 5 to 10 grams. Thus, in order to significantly shorten the access time of head 10, the weight associated with movable section 14 would preferably be reduced by removal of actuator 31 from movable section 14 and the placement of the focusing function in stationary section 12. For example, a movable objective lens with actuator 31 may be provide in stationary section 12 rather than in movable section 14. However, aberrations are introduced with the movement of such a lens so that refocusing is not accurately accomplished due to the inability to maintain symmetric light ray correspondence between light source 16 and imaged spot 30 upon movement of the objective lens.

In another approach, objective lens 28 may be maintained stationary and image spot 30 at recording medium 32 may be moved or repositioned by moving light source 16 in stationary section 12 in the direction of the optical axis. However, in moving source 16, aberrations occur in both objective lens 18 and 28 so that, again, refocusing is not accurately accomplished due the inability to maintain symmetric light ray correspondence between light source 16 and imaged spot 30 upon movement of light source 16.

Thus, it is an object of this invention to provide for focusing of image spot 30 by movement of light source 16 or by movement of an objective lens in optical system 10 with the suppression of aberration that is generated due to such movement. It is another object of the present invention to provide means for maintenance of a good beam on a focal point in an optical system while suppressing aberration due to movement of optical components in the optical system to achieve such maintenance. It is another object of this invention to provide an optical head having a stationary section and a movable section that is capable of achieving high speed random accession in optical information processing apparatus beyond that achieved in the present state of the art due to the significant reduction of the mass necessary in the movable section of the optical head while maintaining a focused light beam substantially free of aberration.

SUMMARY OF THE INVENTION

According to this invention, an optical system, that includes a light source having sufficient coherency to provide a predominate operating wavelength and a diffraction grating lens system to focus the light from the light source to an image point on the optical axis of the optical system, provides for change of position of the image point along the optical axis over a wide focusing range with suppression of generated aberration. In particular, the optical system of this invention comprises a light source both movable in the direction of the optical axis and capable of variation in wavelength and a diffraction grating lens system that condenses the beam from the light source to an image point on and along the optical axis, which system is effective in cancelling out aberration generated due to movement of the light source.

The image point position along the optical axis of the optical system is changed by changing the position of the light source or its equivalent along the same axis. By "equivalent", it is meant, for example, the reimage of the light source along the optical axis of the optical system which is equivalent to the image of the light source at its point of origin. By changing the position of the light source or its equivalent, spherical aberration is generated at the image point so that all light rays are not focused to a single point. This spherical aberration, however, is cancelled out by chromatic aberration in the diffraction grating lens by adjustment to the wavelength of the light source. Thus, two aberration functions are generated by the optical system of this invention that cancel one another. One aberration function is produced due to the changes in the position of the light source. The other aberration function is produced due to changes in the wavelength of the light source relative to a diffraction grating lens employed in the lens system of the optical system. Thus, spherical aberration generated by the change in the position of the light source in a diffraction grating lens system, comprising, for example, a spherical objective lens with a diffraction grating lens formed on one surface of the spherical lens, is effectively cancelled out by chromatic aberration in the diffraction grating lens generated by a change in the wavelength of the light source. In other words, movement of the light source and changes in its wavelength cooperatively bring about both movement of the image point and suppression of aberration generated due to light source movement.

Because the light source may be placed in the stationary section of an optical head and the light source or its equivalent moved along the axis of the optical system to accomplish focusing with the suppression of aberration, there is no need for an actuator in a movable section of an optical head to provide focusing and transverse track adjustment functions. Only adjustment of the optical head movable section is necessary for random head access. Thus, the movable section of an optical head need only contain the diffraction grating lens system of this invention and, possibly, a folding mirror as well as the movable section housing as compared to prior art optical head movable sections. As a result, enhanced accession time can be achieved due to a lighter weight optical head movable section.

Thus, with the optical system of this invention employed in an optical head, the image spot can be moved over a wide range with suppression of the generation of aberration by employing a diffraction grating lens system housed in the movable section of an optical head in combination with a wavelength tunable light source or its equivalent image movable along the optical axis housed in the stationary section of the optical head. With this arrangement, the optical head movable section is reduced to the weight of only a diffraction grating lens system, a reflecting mirror and the movable section housing. Further, aberration resulting from the movement of the imaged light source in the optical head stationary section is substantially eliminated or suppressed by the employment of a diffraction grating in the optical head movable section in combination with variation of the wavelength of the light source in the optical head stationary section.

Alternatively, a plurality of light sources of different wavelengths may be employed in combination with a movable objective lens housed in the stationary section of the optical head and a diffraction grating lens system housed in the movable section of the optical head. The latter configuration provides for an optical system with an even wider focusing range with aberration suppression.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The focused image point or spot formed by an objective lens on and along an optical axis in an optical system can be moved or adjusted along the optical axis by moving the light source along the same axis. As a result, the sign of the spherical aberration generated due to this movement will also change. On the other hand, if a diffraction grating lens, such as a microfresnel lens or a holographic lens, is employed, the diffraction angle of the lens will vary with a change in wavelength. A change to a longer wavelength will provide a larger diffraction angle in the diffraction grating lens and a change to a shorter wavelength will provide a smaller diffraction angle in the diffraction grating lens. Thus, an image point or spot can be moved along the optical axis with the generation of chromatic aberration. The sign of the chromatic aberration generated is based upon the direction of the wavelength variation relative to the designed center wavelength of the light source, which may be a coherent light source, such as, for example, a semiconductor laser, or a light source that has sufficient coherency to operate at a predominate center wavelength.

More particularly, a change in the position of the light source or its equivalent, in order to change the position of the image spot or point, generates spherical aberration. Also, a change in wavelength of the light source will generate chromatic aberration at the diffraction grating lens. By concurrently changing the wavelength of the light source with the movement of the light source, the generated chromatic aberration can be made to effectively cancel out or suppress the spherical aberration generated by the light source. Thus, according to this invention, spherical aberration generated by a change in the position of the light source in a diffraction grating lens system, having a spherical objective lens with a grating lens formed on one surface of the spherical lens, is cancelled out by the chromatic aberration in the grating lens generated by a corresponding change in the wavelength of the light source. An example of the effectiveness of this aberration suppression is illustrated in connection with FIGS. 2-5.

Figure 2:
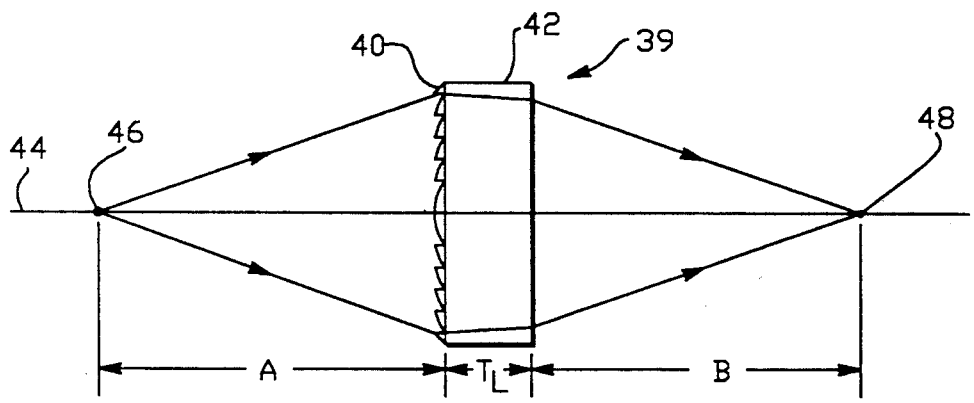
FIG. 2 is a diagram of the principal part of the optical system comprising this invention.

FIG. 2 illustrates a lens system 39 employed in the practice of this invention. Lens system 39 comprises a diffraction grating lens, such as, microfresnel lens 40, fabricated on the surface of a glass substrate 42. Lens 40 may also be a grating lens, a hologram lens, a surface relief hologram lens or a zone plate. For the purpose of exemplification, it may be presumed that substrate 42 is a spherical lens having infinite radius of curvature. Thus, other lens aberrations, such as comma and astigmatism, therefore, may be considered substantially nonexistent for the purpose of this example. Microfresnel lens 40 is designed to focus the divergent light from light source 46 on optical axis 44 to the image point 48 also on optical axis 44. As a specific example, glass substrate 42 may have a thickness, $T_L$, of 2 mm, a refractive index, $N_d$ of 1.517 and an Abbe's number, $V_d$, of 64.2. The distance, A, between light source 46 and microfresnel lens 40 is 4 mm and the distance, B, between glass substrate 42 and image point 48 is 4 mm. The radius of the microfresnel lens is 2 mm. The maximum outer periphery of lens 40 is defined as 1.0. The designed center wavelength of the light source is 830 nm.

In FIGS. 3A-5B, the abscissa indicates the incident height, R, of the light beam to microfresnel lens 40 and the ordinate indicates the lateral aberration, Y. Since microfresnel lens 40 has axial symmetry, lateral aberration, as a representation of the occurring spherical aberration, need only be illustrated in the radial direction of the lens.

Figure 3A:
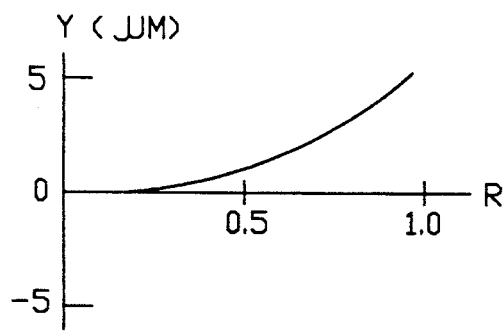
FIGS. 3A and 3B; 4A and 4B; and 5A and 5B are graphic illustrations of variations in lateral aberration, Y, relative to incident beam height, R, for the purpose of explaining the functional operation of the optical system shown in FIG. 2.
Figure 3B:
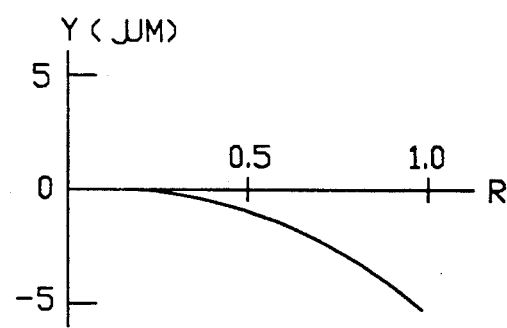

Based upon this arrangement, the results obtained when image point 48 is moved along optical axis 44 by moving light source 46 along the same axis while the wavelength of the light source remains fixed is illustrated in FIGS. 3A and 3B. In FIG. 3A, the amount of movement of light source 46 was $-58$ $\mu$m and the amount of movement of image point 48 along axis 44 was $-0.1$ mm. In FIG. 3B, the amount of movement of light source 46 was $+55$ $\mu$m and the amount of movement of image point 48 along axis 44 was $+0.1$ mm.

Figure 4A:
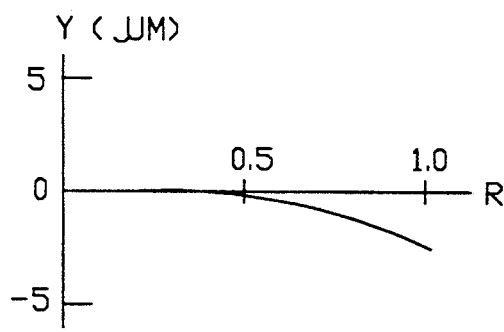
Figure 4B:
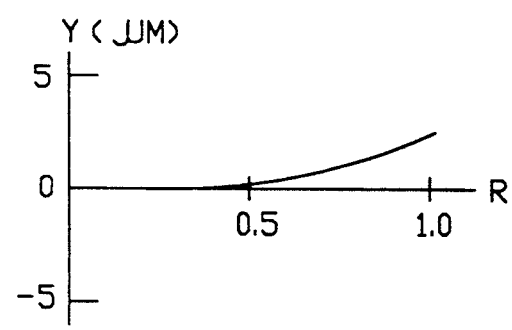

FIGS. 4A and 4B illustrates the amount of lateral aberration generated when image point 48 is moved due to a change in the wavelength of light source 46 while the position of light source 46 on axis 44 remains fixed. In FIG. 4A, the amount of variation in light source wavelength was $+6.8$ nm and the amount of movement of image point 48 along optical axis 44 was $-0.1$ mm. In FIG. 4B, the amount of variation in light source wavelength was $-6.6$ nm and the amount of movement of image point 48 along optical axis 44 was $+0.1$ mm.

Figure 5A:
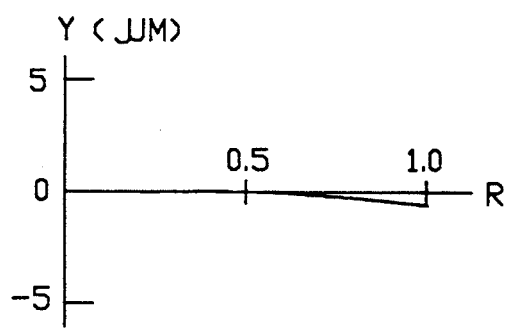
Figure 5B:
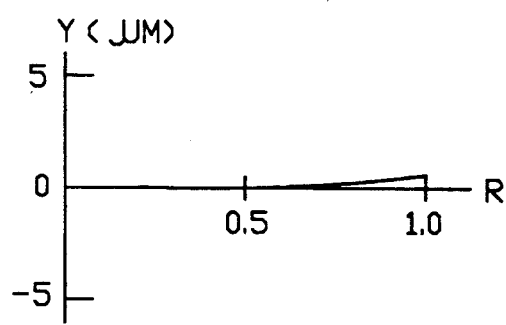

FIGS. 5A and 5B illustrates the amount of lateral aberration generated when both the position and wavelength of light source 46 are concurrently changed. In FIG. 5A, the amount of movement of light source 46 was $-19$ $\mu$m, the amount of variation in light source wavelength was $+4.6$ nm and the amount of movement of image point 48 along axis 44 was $-0.1$ mm. In FIG. 5B, the amount of movement of light source 46 was $+17$ $\mu$m, the amount of variation in light source wavelength was $-4.6$ nm and the amount of movement of image point 48 along axis 44 was $+0.1$ mm.

It can be seen from the results of comparison among the examples of FIGS. 3A-5B that the lateral aberration generated over a wide range of image point movement can be corrected by the present invention wherein image point 48 is moved along optical axis 44 by concurrent variation of both the position and wavelength of light source 46. The result is that a marked improvement in aberration correction is achieved compared to the case where image point 48 is moved either by the movement of the position of light source 46 or the variation of the wavelength of light source 46.

Figure 14:
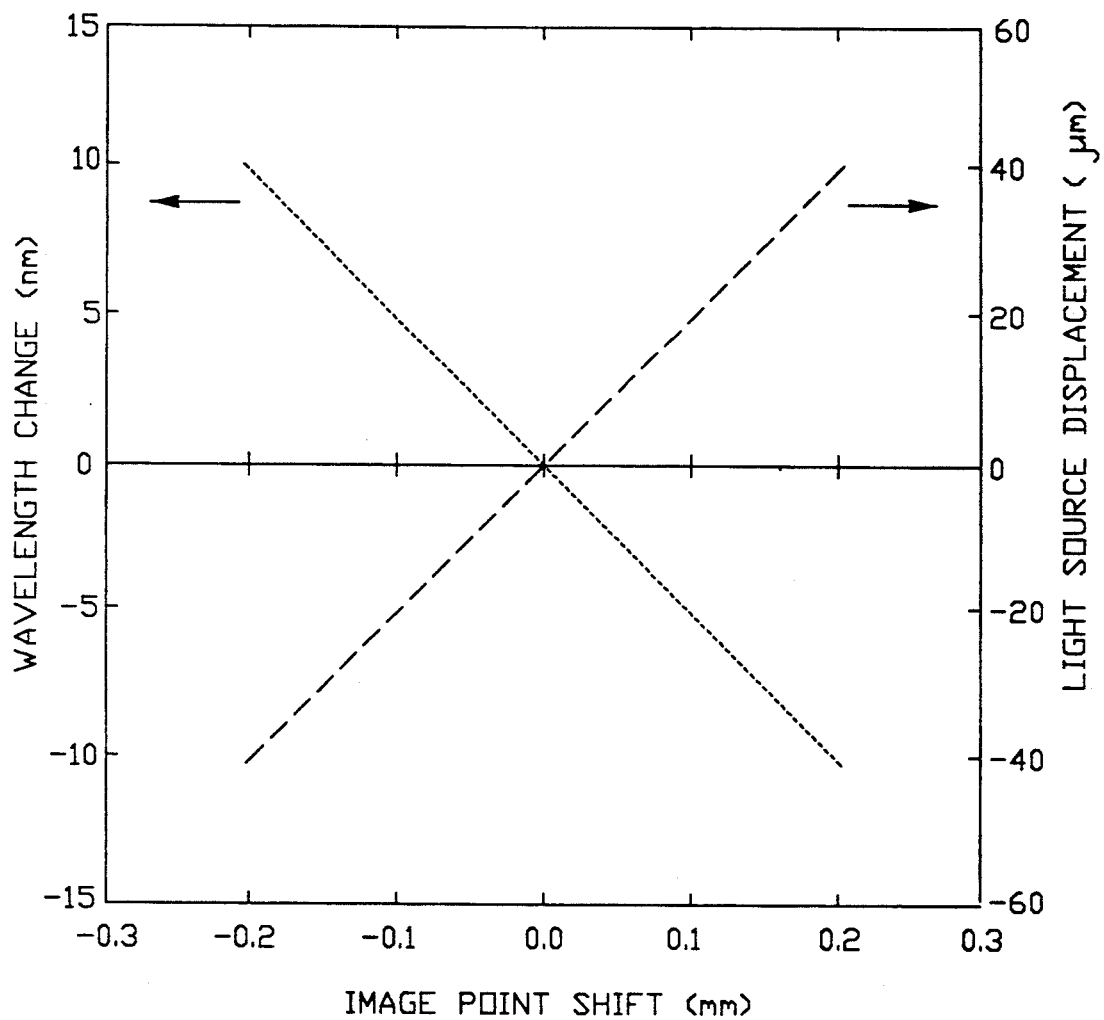
FIG. 14 is a graphic illustration of an example of the correlation of changes necessary in both the position and wavelength of a light source in repositioning a focused image point relative to the embodiment of FIG. 2.

For the layout of FIG. 2, the amount of change in the position of light source 46 and the amount of change in the wavelength of light source 46 for determining the amount of change in the position of a predetermined image point 48 is shown in the graphic illustration of FIG. 14. The abscissa indicates the amount of change in the position of image point 48 when aberration is minimum. The left ordinate indicates the amount of change in wavelength of light source 46 and the right ordinate indicates the amount of change in the position of light source 46. As an example, in order to move image point 48 by $-0.2$ mm, the position of light source 46 should be moved by approximately $-40$ $\mu$m and concurrently the wavelength of light source 46 should be changed by approximately $+10$ nm. Thus, a focused image point 48 can be moved approximately $-0.2$ mm to $+0.2$ mm by changing both the position of light source 46 by $-45$ μm to +34 μm and the wavelength by +10 nm to −10 nm.

Several specific embodiments will now be described which illustrate the principal of this invention as set forth and illustrated in FIGS. 2-5B. As will be evident in subsequently described embodiments of this invention, light source 46 may moved along optical axis 44 either by means of an actuator to move light source 46 itself or a reimaged point of light source 46 created intermediate of the optical system in front of microfresnel lens 40 by employing a pair of objective lens wherein one of the lens, e.g., the condensing lens, is translated along optical axis 44 by means of such an actuator. Further, as will be illustrated by subsequently described embodiments, the limitation as to the range of variance of the light source wavelength can be expanded by employing a plurality of light sources in the optical system wherein each light source has a different center wavelength.

Figure 6:
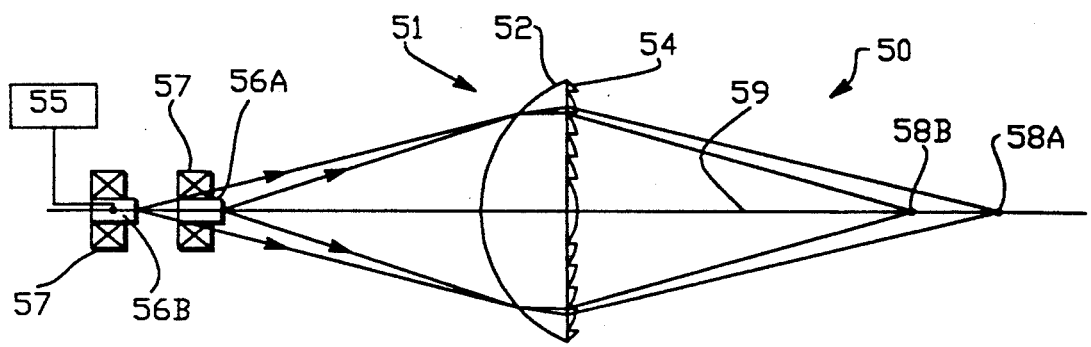
FIG. 6 is a first embodiment of an optical system comprising this invention with means for aberration suppression.

Reference is now made to FIG. 6 wherein there is shown a first embodiment of this invention. Optical system 50 comprises a diffraction grating lens system 51 having spherical objective lens 52 with microfresnel lens 54 formed on one surface of lens 52. Also, lens 54 may be arranged on a spherical surface of an objective lens instead on a flat surface as illustrated in FIG. 6. Thus, lens 54 may be formed on either surface of lens 52, as the resultant effect of aberration suppression is the same even though the chromatic aberration generated per se may vary relative to the orientation of lens 54. Lens 52 may also be a combination of lens or may be a lens having an aspheric surface or may have a gradient index. Lens 54 may also be a grating lens, a hologram lens, a surface relief hologram lens or a zone plate. Lens system 51 is designed taking into account parameters, such as, the radius of curvature and refractive index of lens, to converge and focus the divergent light from a light source 56 on optical axis 59 to an image point 58 on optical axis 59. Light source 56 may be a wavelength tunable semiconductor laser or any other light source capable of controlled variable wavelength. In this arrangement, image point 58 at 58A may be moved to image point at 58B by moving laser 56 via actuator 57, such as of the electromagnetic coil type or piezoelectric type actuator, from the position at 56A to the position at 56B in combination with a change in laser wavelength of laser 56 via wavelength control unit 55 to suppress the aberration generated due to the change in position of laser 56 to the position at 56B.

Wavelength tunable laser 56 is known in the art. For instance, it is constructed to have a wavelength control region integrated into its light emitting region and this control region, via wavelength control unit 55, may be employed to vary the laser wavelength. One example of such a laser is illustrated in U.S. Pat. No. 4,885,753. Another example of a wavelength tunable laser 56 is one constructed to have a diffraction grating or a mirror provided in an external cavity established relative to an emitter region of the laser. This grating or mirror, via wavelength control unit 55, may be employed to vary the laser wavelength. One example of such a laser is illustrated in U.S. Pat. No. 4,656,641. Also, the wavelength of laser 56 may be varied by changes in the injection current or by changes in the temperature via wavelength control unit 55.

Figure 7:
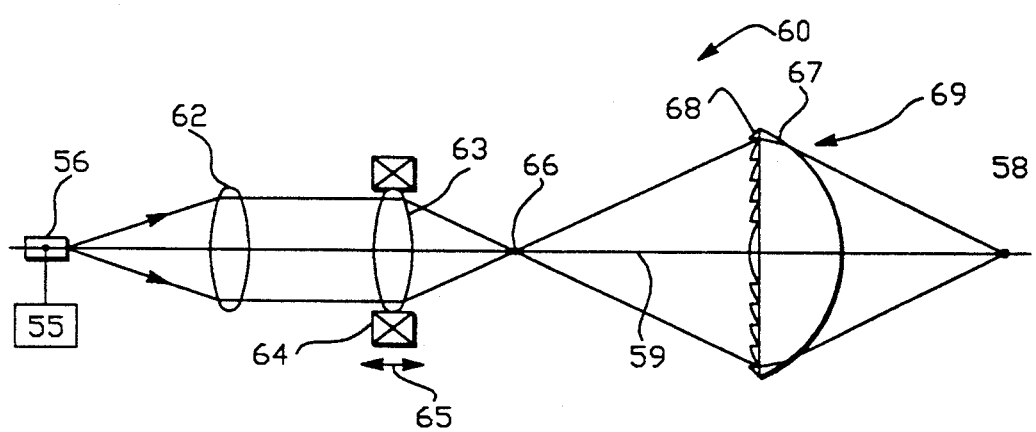
FIG. 7 is a second embodiment of an optical system comprising this invention with means for aberration suppression.

Reference is now made to FIG. 7 wherein there is shown a second embodiment of this invention. Optical system 60 of FIG. 7 is similar in certain aspects to optical system 50 of FIG. 6 and, therefore, like components of these systems carry the same numerical identification and the description thereof relative to FIG. 6 equally applies to FIG. 7. Optical system 60 comprises wavelength tunable semiconductor laser 56 which produces an output beam collimated by objective lens 62 and is focused to a first image point 66 by objective lens 63. Light from image point 66 is, in turn, focused to a second image point 58 by means of diffraction grating lens system 69 comprising microfresnel lens 68 and objective lens 67. Thus, first image point 66 focused by lens 63 becomes the light source for lens system 69. In this case, therefore, it is not necessary to move laser source 56 to move or relocate image point 58 along optical axis 59 but rather objective lens 63 is moved by means of actuator 64 to move image point 66 in opposite directions along optical axis 59 of system 60.

Figure 8:
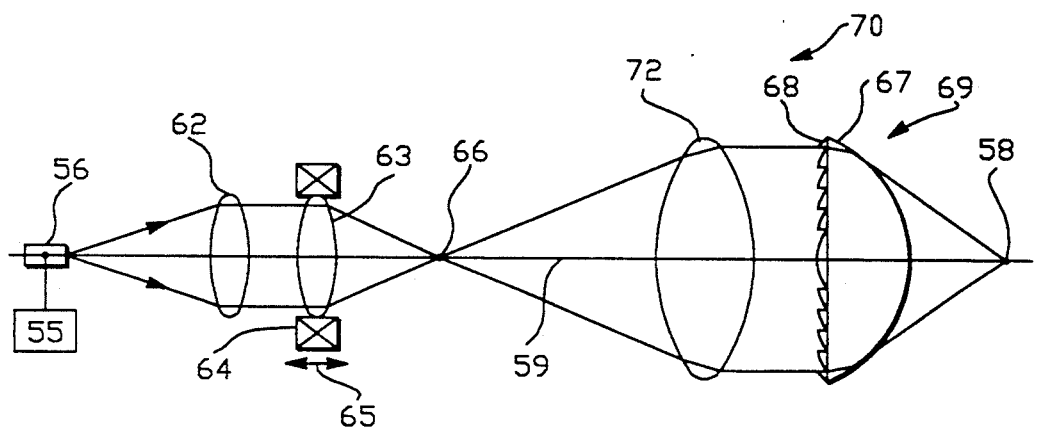
FIG. 8 is a third embodiment of an optical system comprising this invention with means for aberration suppression.

Reference is now made to FIG. 8 wherein there is shown a third embodiment of this invention. Optical system 70 is similar to optical system 60 of FIG. 7, except for the addition of objective lens 72, and, therefore, like components of these systems carry the same numerical identification and the description thereof relative to FIG. 7 equally applies to FIG. 8. The reimaged light beam from first image point 66 is collimated by objective lens 72 and is focused onto second image point 58 by means of lens system 69. The movement of second image point 58 is carried out by moving objective lens 63 to move first image point 66 in either direction along optical axis 59 via lens actuator 64. Also, second image point 58 may also be moved by means of an actuator (not shown) operative to move objective lens 72 in either direction along optical axis 59.

Figure 9:
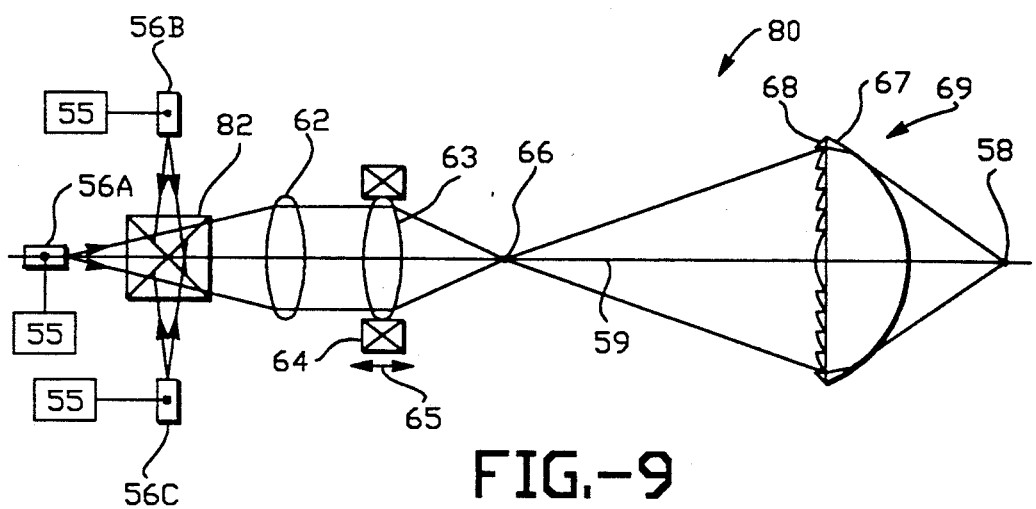
FIG. 9 is a fourth embodiment of an optical system comprising this invention with means for aberration suppression.

Reference is now made to FIG. 9 wherein there is shown a fourth embodiment of this invention. Optical system 80 is similar to optical system 60 of FIG. 7, except for the addition of several lasers 56A, 56B and 56C and prism 82, and, therefore, like components of these systems carry the same numerical identification and the description thereof relative to FIG. 7 equally applies to FIG. 9. Optical system 80 comprises several wavelength tunable semiconductor lasers 56A, 56B and 56C having different center wavelengths with their respective output beams brought into alignment and coincidence with optical axis 59 by means of prism 82. While three such lasers are illustrated in FIG. 9, this invention is not limited by the number of lasers, as the number may be more or less than that shown. The selected output beam from one of the operated lasers 56A-56C is passed through prism 82, collimated by objective lens 62 and focused by movable objective lens 63 to a first image point 66 as in the case of the previous two embodiments. When objective lens 63 is moved by actuator 64, as indicated by arrow 65, first image point 66 is also moved along optical axis 59. Therefore, second image point 58 formed by lens system 69 is also moved along optical axis 59. The aberration generated due to the axial movement of these image points may be substantially corrected or suppressed by selectively varying the operational wavelength of a selected laser 56 or by selection of another laser 56 and selectively varying the operational wavelength thereof. For example, if the center wavelength of lasers 56A, 56B and 56C are respectively 810 nm, 830, and 840 nm, it is possible to change the combined center wavelength over a range of about 50 nm, i.e., from about 800 nm to about 850 nm. However, in the case of employing a single laser source 56, such as employed in the embodiments of FIGS. 7 and 8, having, for example, a center wavelength of 830 nm, it is possible to change the wavelength over a range of about 20 nm. Thus, the addition of two or more lasers extends the range of wavelength variation with suppression of aberration produced by the movement of image point 66 and, therefore, extends the range of distance for repositioning focused image point 58 along optical axis 59 with aberration suppression.

Alternatively, movement of second image point 58 in FIG. 9 along optical axis 59 may also be accomplished by movement of first image point 66 by means of varying the distance, via an actuator (not shown), between a selected laser 56 and prism 82 or by the movement of the entire light source system comprising lasers 56A, 56B and 56C and prism 82 mounted on the same platform via a platform actuator.

Figure 10:
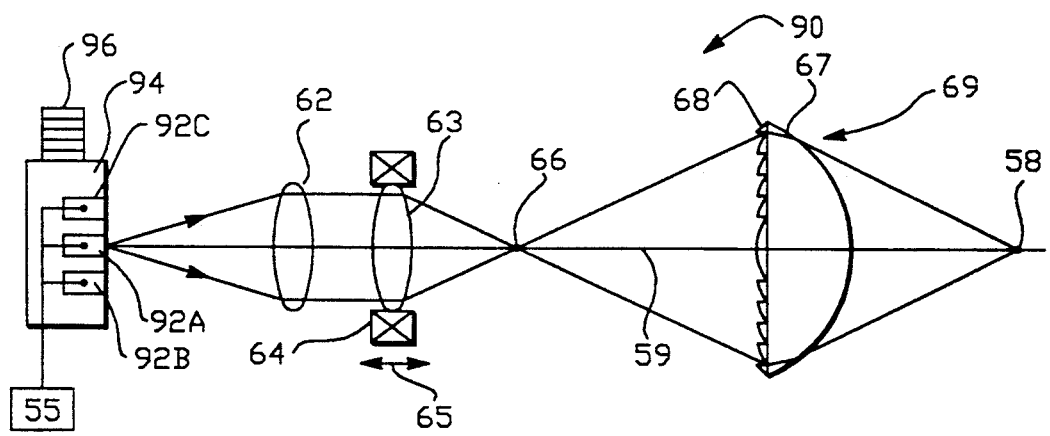
FIG. 10 is fifth embodiment of an optical system comprising this invention with means for aberration suppression.

Reference is now made to FIG. 10 wherein there is shown a fifth embodiment of this invention. Optical system 90 is similar to optical system 60 of FIG. 7, except for the addition of multiple emitter laser source 94, and, therefore, like components of these systems carry the same numerical identification and the description thereof relative to FIG. 7 equally applies to FIG. 10. Optical system 90 comprises monolithic multiple emitter laser source 94 having emitters 92A, 92B and 92C each having a different designed center wavelength. Based upon the desired change in wavelength needed for suppression of aberration due to movement of image point 58, a selected laser emitter 92 is brought into axial alignment with optical axis 59 by means of piezoelectric actuator 96 and the wavelength of the selected laser emitter turned to maximize aberration suppression. Thus, by transversely moving multiple emitter laser 94 and varying the wavelength of a selected laser 92A, 92B or 92C brought into optical alignment with optical axis 59 of system 90, aberration produced upon movement of image point 58, caused by movement of lens 63 by actuator 64, can be minimized.

Figure 11:
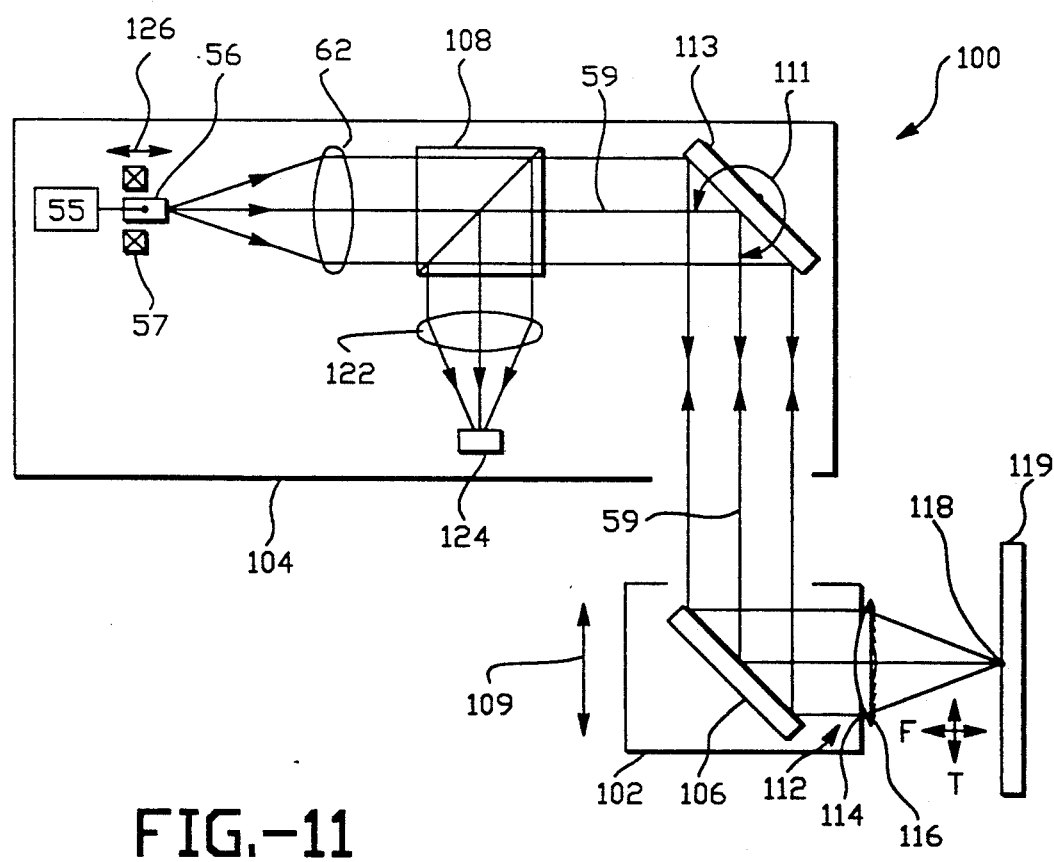
FIG. 11 is a first embodiment of an optical head incorporating the optical system of this invention.

The next three embodiments relate to optical heads for use in conjunction with optical information processing apparatus utilizing the principals of this invention. As shown in FIG. 11, optical head 100 comprises two sections, a movable section 102 and a stationary section 104. Stationary section 104 comprises laser source 56 mounted in connection with actuator 57 for moving laser 56 in opposite directions relative to optical axis 59, as indicated by arrow 126. The beam from laser 56 is collimated by objective lens 62 and passes through beam splitter 108 where it is folded by galvano-mirror 113 onto mirror 106 in movable section 102. Movable section 102 includes folding mirror 106 and diffraction grating lens system 112 comprising objective lens 114 and microfresnel lens 116 formed on the surface of lens 114. Thus, the reflected beam from mirror 106 is focused to image spot 118 on recording medium 119 by lens system 112.

The reflected beam of light from recording medium 119, the intensity level and other characteristics of which may be indicative of recorded data, is received by beam splitter 108 via lens system 112 and mirrors 106 and 113 and is directed by beam splitter 108 onto photodetector 124 via objective lens 122. As well known in the art, there are two signals derived from photodetector 124: a focusing error signal indicative of a dislocation in the focusing direction, F, of the focused image spot 118 relative to the surface of recording medium 119 and a tracking error signal indicative of a deviation in the transverse tracking direction, T, of focused image spot 118 relative to a designated track on medium 119. Based upon the focusing error signal, wavelength tunable laser 56 is moved in a direction of arrow 126 via actuator 57, in combination with changes in the wavelength of laser 56 via control unit 55, in order to focus image spot 118 on the surface of medium 119 while generated aberration is suppressed in the manner indicated in FIG. 5.

Based upon the tracking error signal, image spot 118 is moved in the traverse track direction, T, by rotation through a small angle via mirror 113, as indicated by arrow 111, to recenter the beam on a designated track on medium 119.

Figure 1:
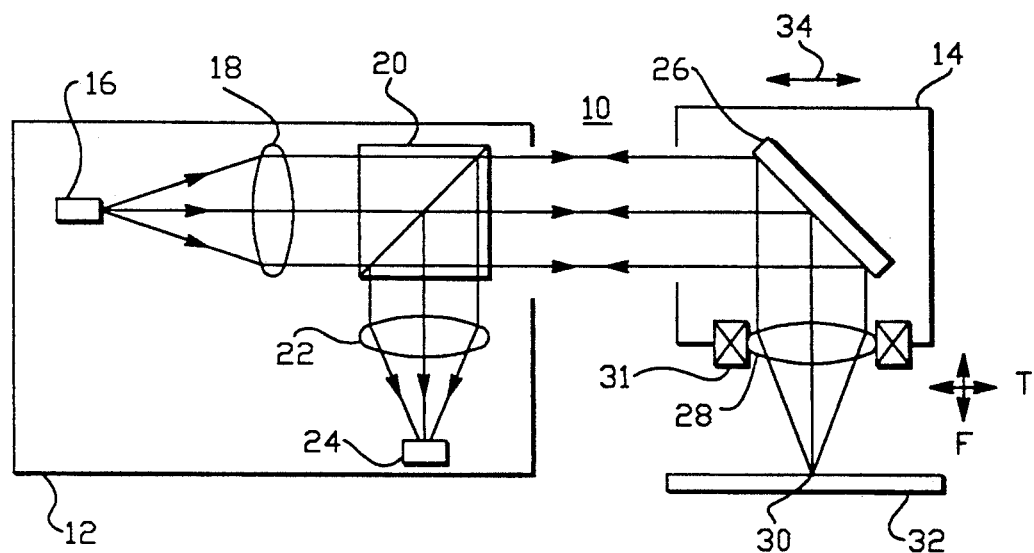
FIG. 1 is a diagram of a conventional optical head known in the art.

An important aspect of this invention is that all elements of the optical system for focusing image spot 118 are in stationary section 104 except for lens system 112 and mirror 106 in movable section 102. Therefore, only the combined weight of mirror 106, lens system 112 and section 102 are moved by a voice coil motor (VCM) during the high speed random accessing of data on medium 119 wherein image spot 118 is translated to various positions along the surface of medium 119 via the VCM, as indicated by arrow 109. Thus, high speed random access is obtainable with use of less components and weight in movable section 102, including the elimination of a heavy lens actuator 31 of the type indicated in FIG. 1.

Figure 12:
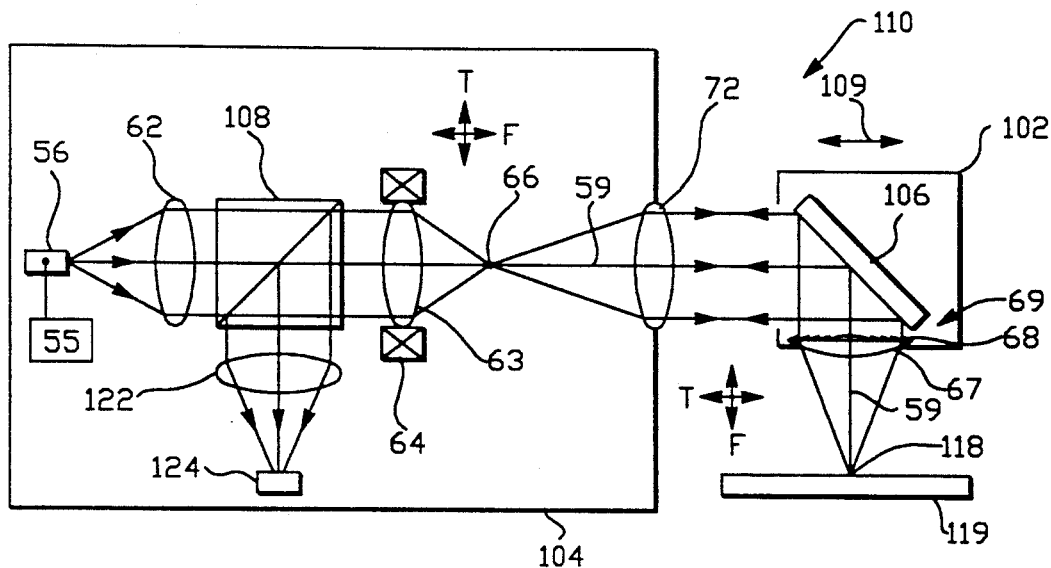
FIG. 12 is a second embodiment of an optical head incorporating the optical system of this invention.

Reference is now made to optical head 110 shown in FIG. 12. Head 110 comprises movable section 102 and stationary section 104. In section 104, the light beam from laser 56 is passed through collimating objective lens 62, beam splitter 108 and converging lens 63 to form a first image point 66. Image point 66 is reimaged by means of collimating objective lens 72 of stationary section 104 onto mirror 106 in movable section 102. The beam is then folded by mirror 106 and focused to image spot 118 on the surface of recording medium 119 by means of diffraction grating lens system 69.

The reflected light from image spot 118 is reflected back through the optical system to beam splitters 108, as well known in the art, and is focused onto photodetector 124 via objective lens 122. As previously indicated in connection with the embodiment in FIG. 11, there are two signals derived from photodetector 124: a focusing error signal indicative of a dislocation in the focusing direction, F, of the focused image spot 118 relative to the surface of recording medium 119 and a tracking error signal indicative of a deviation in the transverse tracking direction, T, of focused image spot 118 relative to a designated track on medium 119. Based upon the focussing error signal, the image spot 118 is moved in the focusing direction, F, by moving lens 63 via actuator 64 to move first image point 66 in the focusing direction, F, concurrently with variation in the operating wavelength of laser 56 to suppress aberration in the manner illustrated in FIG. 5.

Based on the tracking error signal, actuator 64 moves lens 63 in the transverse track direction, T, to recenter the beam on a designated track of medium 119.

As indicated in connection with the previous embodiment, an important aspect of this invention is that all elements of the optical system for focusing image spot 118 are in stationary section 104 except for lens system 69 and mirror 106 in movable section 102. Therefore, only the combined weight of mirror 106, lens system 69 and section 102 are moved by a VCM during the high speed random accessing of data on medium 119 wherein image spot 118 is translated to various track positions along the surface of medium 119 via the VCM, as indicated by arrow 109. Thus, high speed random access is obtainable with use of less components and weight in movable section 102, including the elimination of a heavy lens actuator 31 of the type indicated in FIG. 1.

Figure 13:
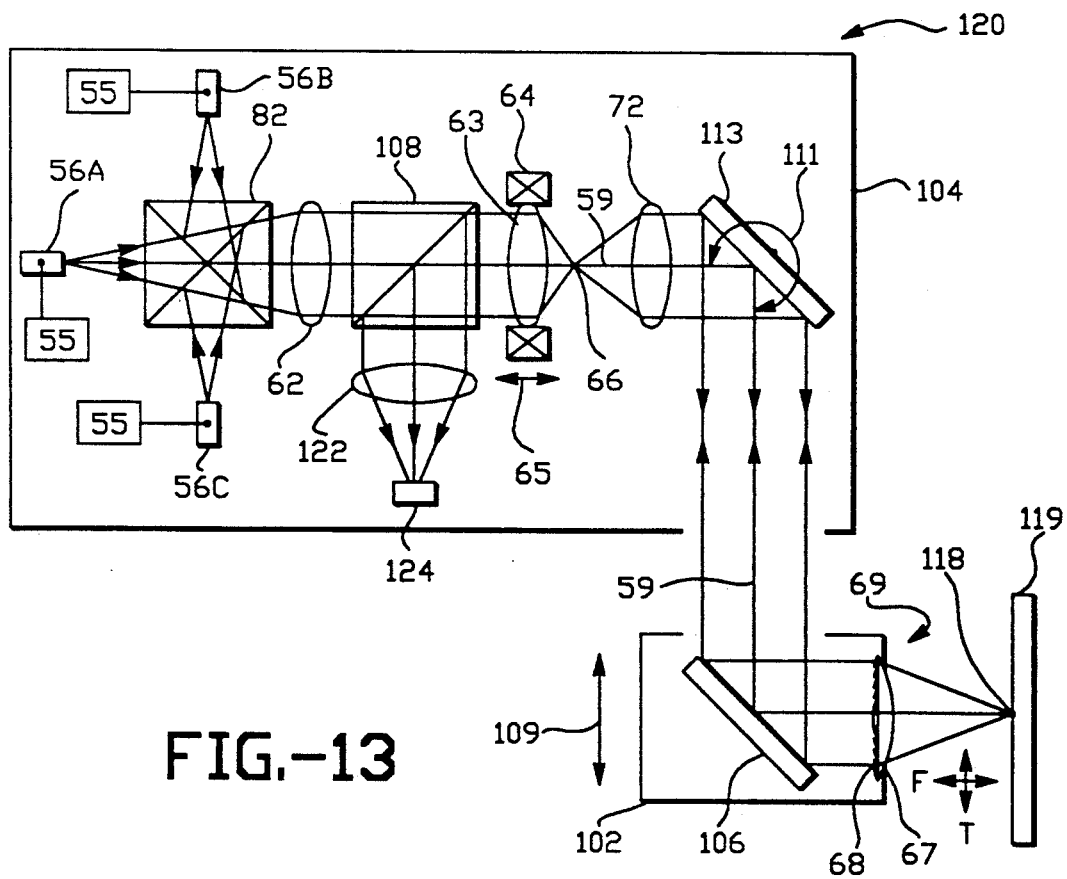
FIG. 13 is a third embodiment of an optical head incorporating the optical system of this invention.

Reference is now made to optical head 120 shown in FIG. 13. Head 120 comprises movable section 102 and stationary section 104. In section 104, three wavelength tunable semiconductor lasers 56A, 56B and 56C each have a differently designed center wavelength and are brought into alignment and coincidence with optical axis 59 by means of prism 82. As in the case of the FIG. 9 embodiment, while three such lasers are illustrated in FIG. 13, this invention is not limited by the number of lasers, as the number may be more or less than that shown. The selected output beam from one of the operated lasers 56A-56C is collimated via objective lens 62 and focused by objective lens 63 via beam splitter 108 to a first image point 66. When objective lens 63 is moved in either direction by actuator 64, as indicated by arrow 65, first image point 66 is also moved along optical axis 59. The image point 66 formed by objective lens 63 becomes the light source for lens system 69. The divergent light from point 66 is collimated by objective lens 72, reflected by galvano-mirror 113 and thence by mirror 106 in movable section 102 for focus via diffraction grating lens system 69 as an image spot 118 on the surface of recording medium 119. Lens system 69 comprises microfresnel lens 68 and objective lens 67 with lens 68 formed on the surface of lens 67.

Second image spot 118 formed by lens system 69 is also moved along optical axis 59 by movement of lens 63 via actuator 64. The aberration generated due to the axial movement of these image positions may be substantially corrected or suppressed by selectively varying the operational wavelength of a selected laser 56 or by selection of another laser 56 having a different center wavelength and selectively varying the operational wavelength thereof. For example, if the center wavelength of lasers 56A, 56B and 56C are respectively 810 nm, 830, and 840 nm, it is possible to change the combined wavelength over a range of about 50 nm, i.e., from about 800 nm to about 850 nm. However, in the case of employing a single laser source 56, such as employed in the embodiments of FIGS. 11 and 12, having, for example, a center wavelength of about 830 nm, it is possible to change the wavelength over a range of about 20 nm. Thus, the addition of two or more lasers positioned in the optical path extends the range of wavelength variation toward substantially full correction or suppression of aberration produced upon the movement of image point 66.

Light reflected from medium 119 at spot 118, which would also include optical characteristics representative of recorded data, is reflected back along optical axis 59 of system 120 to beam splitter 108 and is directed onto photodetector 124 via objective lens 122. The data in the reflected beam is detected at photodetector 124 and from this information, as is known in the art, a focusing error signal is derived indicating the dislocation in the focusing direction, F, of the focal point of image spot 118 relative to the surface of medium 119 and a tracking error signal is derived indicating a deviation in the transverse tracking direction, T, of image spot 118 from a designated recorded track. Relative to the focusing error signal, lens 63 is moved as indicated at 65 via actuator 64 to move the position of image point 66 in the focus direction, F, for refocusing of image spot 118 via lens system 69 in combination with a change in operational wavelength of a selected tunable semiconductor 65 in the manner illustrated in FIG. 5.

Relative to the tracking error signal, image point 118 is articulated in the transverse track direction, T, by rotating galvano-mirror 113 a small angular degree of movement, as indicated by arrow 111, to recenter the beam on a designated track of recording medium 119.

As indicated in connection with the previous two embodiments, an important aspect of this invention is that all elements of the optical system for focusing image spot 118 are in stationary section 104 except for lens system 69 and mirror 106 in movable section 102. Therefore, only the combined weight of mirror 106, lens system 69 and section 102 are moved by a VCM during the high speed random accessing of data on medium 119 wherein image spot 118 is translated to various positions along the surface of medium 119 via the motor, as indicated by arrow 109. As a specific example, movable section 102 in the embodiments of FIGS. 11-13 may weigh only 2 to 3 grams, compared to movable section 14 (FIG. 1) of the prior art which may weigh between 5 to 10 grams. Actuator 31, for example, typically weighs about 9 grams. Therefore, a weight reduction of movable section 102 will be in the range of about 60% to 80% over prior art movable section 14. Thus, high speed random access is obtainable with less components and weight in section 102, including the elimination of a heavy lens actuator 31 of the type indicated in FIG. 1.

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope of the appended claims.

What is claimed is:

1. An optical system having an optical axis for focusing a light beam to an image point on said optical axis and comprising:

a light source having sufficient coherency to provide a predominate operational center wavelength with at least one output light beam and including means to vary the output wavelength of said light source, lens means to focus said light beam to said image point, means to move said light source at a point along said optical axis to reposition said image point, said lens means including a diffraction grating means for focusing said output beam irrespective of changes in the position of said light source along said optical axis, wherein the movement of said light source is accompanied with a concurrent change in the wavelength of said light source to move said image point with said change in wavelength creating an aberration which is opposite in effect to aberration generated due to movement of said light source thereby cancelling one another to produce a substantially aberration-free image.

2. The optical system of claim 1 wherein said diffraction grating means is selected from the group consisting of a micro-Fresnel lens, a hologram lens, a grating lens and a zone plate in combination with an objective lens.

3. The optical system of claim 2 wherein said light source is a semiconductor laser.

4. The optical system of claim 1 wherein said light source is a plurality of laser light sources providing a plurality of respective laser output beams each with a different center wavelength, means to selectively introduce a selected one of said laser output beams along said optical axis whereby the range of focusing of said image point is extended by the selection of one of said laser output beams and variation of its output wavelength.

5. The optical system of claim 4 wherein said diffraction grating means is selected from the group consisting of a micro-Fresnel lens, a hologram lens, a grating lens and a zone plate in combination with an objective lens.

6. The optical system of claim 5 wherein said laser light sources comprise a multiple emitter semiconductor laser.

7. An optical system having an optical axis for focusing a light beam to an image point on said optical axis comprising:
  a light source having an operating center wavelength,
  means associated with said light source to vary the output wavelength thereof,
  lens means in said optical system including a diffraction grating for focusing said light beam onto an image point, and
  means to move said light source within said optical system to relocate the focus of said image point and
  means to vary said light source wavelength concurrently with movement of said light source to move said image point with changes in wavelength creating an aberration which is opposite in effect to aberration generated due to movement of said light source thereby cancelling one another to produce a substantially aberration-free image.

8. The optical system of claim 7 wherein said diffraction grating lens means is selected from the group consisting of a micro-Fresnel lens, a hologram lens, a grating lens and a zone plate in combination with an objective lens.

9. The optical system of claim 8 wherein said light source is a semiconductor laser.

10. The optical system of claim 7 wherein said light source is a plurality of laser light sources providing a plurality of respective laser output beams each with a different center wavelength, means to selectively introduce a selected one of said laser output beams along said optical axis whereby the range of focusing of said image point with aberration suppression is extended by the selection of one of said laser output beams and variation of its output wavelength.

11. The optical system of claim 10 wherein said diffraction grating lens means is selected from the group consisting of a micro-Fresnel lens, a hologram lens, a grating lens and a zone plate in combination with an objective lens.

12. The optical system of claim 11 wherein said laser light sources comprise a multiple emitter semiconductor laser.

13. An optical head for use in connection with optical information processing apparatus including a recording medium and an optical system for focusing a light beam to an image point on the surface of said recording medium and comprising:
  a light source having an operating center wavelength,
  means associated with said light source to vary the output wavelength thereof,
  lens means in said optical system including a diffraction grating for focusing said output beam onto said recording medium surface, and
  means to move said light source within said optical system to maintain the focus of said image point relative to said recording medium surface, and
  means to vary said light source wavelength concurrently with movement of said light source to move said image point with changes in wavelength creating an aberration which is opposite in effect to aberration generated due to movement of said light source thereby cancelling one another to produce a substantially aberration-free image.

14. The optical head of claim 13 wherein said diffraction grating lens means is selected from the group consisting of a micro-Fresnel lens, a hologram lens, a grating lens and a zone plate in combination with an objective lens.

15. The optical head of claim 14 wherein said light source is a semiconductor laser.

16. The optical head of claim 13 wherein said light source is a plurality of laser light sources providing a plurality of respective laser output beams each with a different center wavelength, means to selectively introduce a selected one of said laser output beams along said optical axis whereby the range of focusing of said image point is extended by the selection of one of said laser output beams and variation of its output wavelength.

17. The optical head of claim 16 wherein said diffraction grating lens means is selected from the group consisting of a micro-Fresnel lens, a hologram lens, a grating lens and a zone plate in combination with an objective lens.

18. The optical head of claim 17 wherein said laser light sources comprises a multiple emitter semiconductor laser.

19. A method of suppressing aberration in an optical system due to changes made in the position of a focused image point from a light source along the optical axis of the system, the light source having sufficient coherency to provide a predominate operational center wavelength and comprising the steps of:
  employing a lens system that induces changes in aberration according to changes in wavelength of the light source,
  moving the light source or a refocused image point of the light source to change the position of the image point along the optical axis, and
  concurrently changing the wavelength of the light source to create an aberration which is opposite in effect to aberration generated by movement of the light source or a refocused image point thereof.

20. The method of claim 19 including the additional steps of:
  providing a plurality of light sources for said light source with each having a different predominate operational center wavelength,
  selecting one of said light sources for alignment with said optical axis
  moving the selected light source or a refocused image point of the selected light source to change the position of the image point along the optical axis, and
  concurrently changing the wavelength of the selected light source to create an aberration which is opposite in effect to aberration generated by movement of the selected light source or its selected reimage thereof.

21. An optical system having an optical axis for focusing a light beam to an image point on said optical axis and comprising:

a light source having sufficient coherency to provide a predominate operational center wavelength with at least one output light beam and including means to vary the output wavelength of said light source, lens means to focus said light beam to said image point, means to move a refocused image point of said light source formed along said optical axis to reposition said image point, said lens means including a diffraction grating means for focusing said output beam irrespective of changes in the position of said refocused image point along said optical axis, wherein the movement of said refocused image point is accompanied with a concurrent change in the wavelength of said light source to move said image point with changes in wavelength creating an aberration which is opposite in effect to aberration generated due to movement of said refocused image point thereby cancelling one another to produce a substantially aberration-free image.

22. The optical system of claim 21 wherein said diffraction grating means is selected from the group consisting of a micro-Fresnel lens, a hologram lens, a grating lens and a zone plate in combination with an objective lens.

23. The optical system of claim 22 wherein said light source is a semiconductor laser.

24. The optical system of claim 21 wherein said light source is a plurality of laser light sources providing a plurality of respective laser output beams each with a different center wavelength, means to selectively introduce a selected one of said laser output beams along said optical axis whereby the range of focusing of said image point is extended by the selection of one of said laser output beams and variation of its output wavelength.

25. The optical system of claim 24 wherein said diffraction grating means is selected from the group consisting of a micro-Fresnel lens, a hologram lens, a grating lens and a zone plate in combination with an objective lens.

26. The optical system of claim 25 wherein said light sources comprise a multiple emitter semiconductor laser.

27. An optical system having an optical axis for focusing a light beam to an image point on said optical axis comprising:

a light source having an operating center wavelength, means associated with said light source to vary the output wavelength thereof, lens means in said optical system including a diffraction grating for focusing said light beam onto an image point, and means to move a refocused image point of said light source formed along said optical axis to relocate the focus of said image point and means to vary said light source wavelength concurrently with movement of said refocused image point to move said image point with changes in wavelength creating an aberration which is opposite in effect to aberration generated due to movement of said refocused image point thereby cancelling one another to produce a substantially aberration-free image.

28. The optical system of claim 27 wherein said diffraction grating lens means is selected from the group consisting of a micro-Fresnel lens, a hologram lens, a grating lens and a zone plate in combination with an objective lens.

29. The optical system of claim 28 wherein said light source is a semiconductor laser.

30. The optical system of claim 27 wherein said light source is a plurality of laser light sources providing a plurality of respective laser output beams each with a different center wavelength, means to selectively introduce a selected one of said laser output beams along said optical axis whereby the range of focusing of said image point with aberration suppression is extended by the selection of one of said laser output beams and variation of its output wavelength.

31. The optical system of claim 30 wherein said diffraction grating lens means is selected from the group consisting of a micro-Fresnel lens, a hologram lens, a grating lens and a zone plate in combination with an objective lens.

32. The optical system of claim 31 wherein said light sources comprise a multiple emitter semiconductor laser.

33. An optical head for use in connection with optical information processing apparatus including a recording medium and an optical system for focusing a light beam to an image point on the surface of said recording medium and comprising:

a light source having an operating center wavelength, means associated with said light source to vary the output wavelength thereof, lens means in said optical system including a diffraction grating for focusing said image point onto said recording medium surface, and means to move a refocused image point of said light source within said optical system to maintain the focus of said image point relative to said recording medium surface, and means to vary said light source wavelength concurrently with movement of said refocused image point to move said image point with changes in wavelength creating an aberration which is opposite in effect to aberration generated due to movement of said refocused image point thereby cancelling one another to produce a substantially aberration-free image.

34. The optical head of claim 33 wherein said diffraction grating lens means is selected from the group consisting of a micro-Fresnel lens, a hologram lens, a grating lens and a zone plate in combination with an objective lens.

35. The optical head of claim 34 wherein said light source is a semiconductor laser.

36. The optical head of claim 33 wherein said light source is a plurality of laser light sources providing a plurality of respective laser output beams each with a different center wavelength, means to selectively introduce a selected one of said laser output beams along said optical axis whereby the range of focusing of said image point is extended by the selection of one of said laser output beams and variation of its output wavelength.

37. The optical head of claim 36 wherein said diffraction grating lens means is selected from the group consisting of a micro-Fresnel lens, a hologram lens, a grating lens and a zone plate in combination with fin objective lens.

38. The optical head of claim 37 wherein said light sources comprises a multiple emitter semiconductor laser.

* * * * *